May 23, 1961  J. BOSCH  2,985,758
APPARATUS FOR CONTINUOUS MEASUREMENT OF RADIOACTIVITY OF LIQUIDS
Filed Oct. 14, 1957
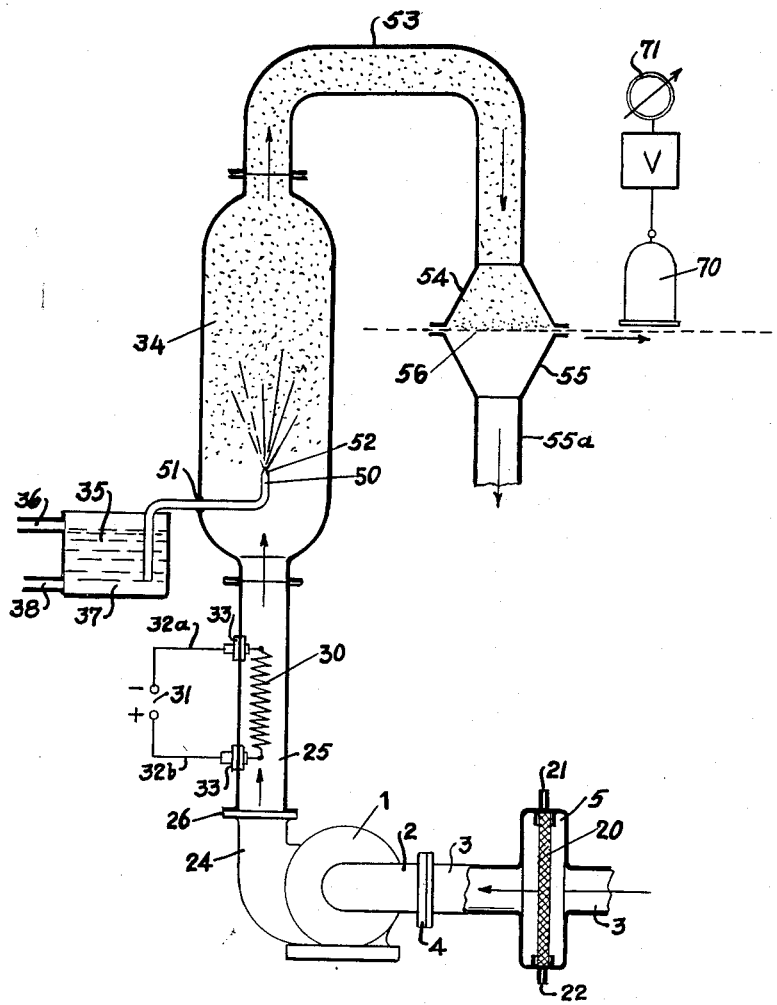
Inventor
JULIUS BOSCH
By Norbert Ederer
HIS Attorney United States Patent Office 2,985,758
Patented May 23, 1961

2,985,758
APPARATUS FOR CONTINUOUS MEASUREMENT OF RADIOACTIVITY OF LIQUIDS

Julius Bosch, Erlangen-Bruck, Bavaria, Germany, assignor to Frieseke & Hoepfner G.m.b.H., a corporation of Germany Filed Oct. 14, 1957, Ser. No. 690,080
Claims priority, application Germany Oct. 18, 1956
2 Claims. (Cl. 250—83.3)

This invention relates to a method and apparatus for the detection and continuous measurement of the radioactivity of water and similar liquids.

The radioactivity of water and similar liquids has heretofore been measured by methods which, simply described, feature the use of a radiation detector, e.g. a Geiger counter, for direct measurement of the radiation emanating from the liquid. This is accomplished in a simple manner by immersing a radiation detector in the liquid. In this manner a well reproducible geometry for the radiation measurement can be attained and therefore the radiation detector can be reliably calibrated. The device and method are useful only in applications where the detectable concentration of the radioactive substances in the liquid is relatively high. The method is too insensitive to determine with good reliability the concentrations with liquids of radioactive substances within the low permissible tolerances.

According to another method, also heretofore known but of higher sensitivity and therefore more suitable for the measurement of low concentrations, the inherent radioactive content of the liquid is increased by addition of radioactive matter. Thereafter the liquid is completely evaporated and the residua are measured for an intensity of radioactivity. Depending on the amount of additional radioactive matter it is possible to measure relatively low inherent radioactive content. This method however is limited to the measurement of isolated samples of liquids and is inconvenient and too time consuming for continuous measurement purposes.

It is a prime object of the invention to provide relatively inexpensive and reliable method and apparatus for the continuous measurement of the inherent radioactive content.

This and other objects are attained in accordance with this invention and in the preferred manner by conveying the liquid in question to a continuously moving air stream which is free from radioactive carriers and is at an elevated temperature, atomizing it therein into the smallest possible droplets thereby to cause its complete evaporation so that practically only the solid residua contained in the original liquid remain as possible carriers of radioactivity and thereby also to suspend the solid residua in the air stream, further conveying the heated air stream including the residua to a filter, depositing the residua on this filter which moves continuously in proximity to a radiation detector which continuously measures the radiation content.

The apparatus for performing such a process comprises, according to the invention, a blower which draws in environmental air through a filter on which the radioactive matter contained therein is effectively filtered out. This purified environmental air is heated to a high temperature in a relatively narrow channel and is caused to enter a chamber of larger diameter. In this chamber the liquid to be measured is introduced, converted to a very fine mist with the aid of an an atomizer or similar spray nozzle, and evaporated. The remaining solid residua of the liquid are in view of their state of equilibrium suspense transported by the air stream through a subsequent channel of a smaller diameter and are deposited on a continuously moving filter. The filter passes in proximity to the radiation detector.

For a better understanding of the invention reference may be had to the following more detailed description considered together with the accompanying drawing in which the single figure is a partly diagrammatic and partly sectional view of the apparatus according to a preferred embodiment of the invention.

Referring to the drawing, a blower 1 pumps in air from the external atmosphere through an inlet 2, which is flange-coupled to coaxial intake pipe 3 as indicated at 4. The intake pipe 3 is provided with a coaxial chamber 5 of enlarged diameter which in turn is provided with a concentric filter 20, which engages the axial interior walls of the chamber 5 and is fastened thereto as at 21 and 22. The air from the outside atmosphere is drawn through the inlet pipe 3 and through the filter 20, but any solid radioactive carriers are deposited on the filter 20 and do not enter the blower 1.

The blower delivers the thus purified air through an exhaust 24 to a coaxial tubular chamber 25 which is flanged coupled to the outlet 24 as at 26. Within the chamber 25 is disposed an electric heater 30 which is energized from a battery 31 by means of connecting leads 32a and 32b which extend into the interior of the chamber 25 through suitable gaskets 33. The purified air is heated to high temperature by the heater 30, sufficiently high to completely evaporate in a coaxial evaporation chamber 34 the incoming water intended to be measured for radioactive content. The chamber communicates with the exhaust pipe 25 but is of enlarged diameter to lower the velocity of the laminar air stream passing therethrough from the bottom to the top. The water 35 is admitted through an inlet 36 to the upper end of a tank 37 which is also provided with an outlet 38 at its lower end. Water flows continuously into the tank through the inlet 36 and the outlet 38 to provide continuous samples for measurement of radioactivity.

Samples are introduced into the lower part of the evaporation chamber 34 by means of an atomizer 50 which extends through the exterior of the chamber 34 into the interior of the tank 37. A gasket 51 is provided at the point of entry of the atomizer 50 into the chamber 34 for thermal and pressure insulation. The atomizer is at its upper end provided with a nozzle 52 of restricted diameter to cause by aspirating action the formation within the chamber of a finely divided mist of small droplets which are quickly evaporated in the hot air stream and are carried along therewith, together with any solid dissolved impurities originally contained in the water, through the chamber 34. The stream leaves the chamber at its upper end and then proceeds through a coaxial communicating pipe 53 to a flare 54 of progressively enlarged diameter, thence through a similar flare 55 of equal terminal diameter which has a progressively decreasing diameter reckoned in the direction of propagation of the stream, and thence through a coaxial exhaust pipe 55a.

A continuously moving filter 56 passes through the gap between the mouths of the flares 54 and 55 transversely of the direction of propagation of the vapor stream. The solid matter contained in the stream is deposited on the filter whereas the vapors pass therethrough to the exhaust 55a. The filter 56 conveys the solid matter past ionization chamber 70 which detects any radioactivity of the solid particles, ultimately in the form of electrical voltages which are amplified by an amplifier V. An indicator 71 is operatively connected to the amplifier V and provides a measure of the radioactivity.

Since the water is continuously sampled and in view of the continuous deposit of solid particles onto the filter 56 and also in view of the continuous movement of the filter 56, the indication by the instrument 71 reflects radioactive content on a continuous basis. The circuitry of the ionization chamber 70, the amplifier V and indicator 71 is conventional and well-known and therefore need not be illustrated in detail.

It should be understood that the invention is not limited to the illustrative examples herein described, reference being had to the appended claims rather than the aforegoing specification to determine the scope of the invention. The terms "continuous" or "continuously" as used herein in the specification and claims are intended to comprehend situations wherein a substantially "continuous" operation is temporarily or momentarily interrupted, as distinguished from the static operation of prior art devices referred to hereinabove.

What is claimed is:

1. Apparatus for continuously measuring the radio-active content of a liquid, comprising fluid propelling means for creating a steadily moving stream of air, filter means for purifying the stream of air to render it free from radioactive carriers, heater means for heating the purified stream of air to a temperature above the vaporization temperature of the liquid, means for continuously introducing samples of the liquid in the form of a spray into the heated and purified air stream whereby said liquid samples are vaporized, a continuously moving filter interposed in the path of the resulting vapor stream for depositing thereon radio-active carriers contained in the liquid samples, and radiation detection means disposed outside said vapor stream and adjacent to said continuously moving filter down-stream with respect to the depositing point for measuring the radio-active content of the deposited carriers.

2. Apparatus for the continuous measurement of the radioactive content of a liquid comprising an air supply system having a blower, a filter disposed at the intake of the blower adapted to collect and screen out radio-active carriers in the intake air, a vaporizing chamber connected to the exhaust of the blower, means for applying heat to the radiation-free exhaust air to raise the temperature thereof above the vaporization temperature of said liquid, aspirator means for introducing atomized samples of the liquid into the vaporizing chamber thereby to cause vaporization of the atomized liquid in the air exhaust stream, a continuously moving filter interposed in the path of propagation of the resulting vapor stream for collecting radio-active carriers contained in the aforesaid liquid samples, and detecting means including an ionization chamber disposed outside said air supply system and adjacent to said moving filter downstream from the carrier collection point for continuously measuring the radio-active content of the carriers deposited on said moving filter.

References Cited in the file of this patent
UNITED STATES PATENTS 2,576,616   Livingston _ _ _ _ _ _ _ _ _ _ _   Nov. 27, 1951

OTHER REFERENCES

Watts et al.: "Monitor Measurer Air and Surface Contamination," Nucleonics, v. 13, #1, pages 51–52, January 1955.